Dec. 31, 1929.    E. FRIEDERICH ET AL    1,741,291
CURRENT RECTIFIER
Filed Sept. 18, 1928
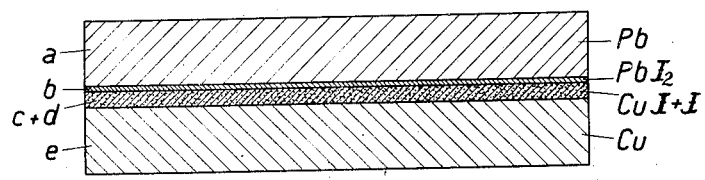

Patented Dec. 31, 1929

1,741,291

UNITED STATES PATENT OFFICE

ERNST FRIEDERICH AND WILFRIED MEYER, OF BERLIN, GERMANY, ASSIGNOR TO PATENT-TREUHAND-GESELLSCHAFT FUER ELEKTRISCHE GLUEHLAMPEN M. B. H., OF BERLIN, GERMANY

CURRENT RECTIFIER

Application filed September 18, 1928, Serial No. 306,679, and in Germany September 30, 1927.

Our invention relates to improvements in electric current rectifiers, and more particularly to rectifiers of the type comprising a couple of the dry surface-contact variety, being an improvement of the rectifiers described in our co-pending application, Serial No. 287,873, filed June 23, 1928.

In such rectifiers comprising several layers of different materials one of which at least is a layer of a poorly conductive compound, the layer of the poorly conductive compound in contact with a metal or a conductive metal compound, must not exced a certain thickness because a too great drop of tension will result. Such a current rectifier at high tensions will scarcely pass any current.

It is exceptionally difficult to make such very thin films mechanically.

It has been proposed to overcome this difficulty by electrolytically coating one of the plates of a current rectifier before assembling, with an oxide, or after assembly of the rectifier to coat the plate on which the poorly conductive coating is to be made by interposing a thin layer of water, and then upon the passage of the current decomposing the water. The products of decomposition of the water reacting with one of the plates to form a poorly conductive coating of oxide or hydroxide.

We have discovered that the difficult mechanical method, as well as the time consuming electrical method of making the rectifying layer or coating may be easily avoided.

This we do by making the parts of the current rectifier, between which the poorly conductive layer shall lie, of materials that shall react with one another, and between which the poorly conductive layer is to be formed so that this layer of reaction compound shall contain products of both layers.

For this purpose, in general, two chemical compounds shall be used, at least one of which is comparatively poorly conductive. The resulting non-conductive layer can be so exceptionally thin that it cannot be determined by the usual analytical methods. It must, however, be present as the two materials in contact with one another, according to the chemical reactions at the temperatures employed, form products that are not stable.

As an example, we may mention lead oxide in contact with cuprous iodide, (CuI) that contains iodine in excess. At the contact surfaces of these two materials there results in presence of the excess iodine, the poorly conductive iodide of lead ($PbI_2$).

In many cases the materials that form the non-conductive layer of lead oxide will react at atmospheric temperatures. In other cases, however, it is advantageous to assist the reaction by external heat or with the assistance of direct or alternating current or by heavy pressure. The rapidity of the reaction can be increased by using all of these methods for causing the reaction, at the same time.

The drawing illustrates a cross section of an element comprising a lead plate $a$, an intermediate layer of cuprous iodide $c$ containing preferably an excess of iodine $d$ and a copper plate $e$. The rectifying layer of $PbI_2$ is indicated at $b$.

The lead plate in contact with the layer of copper iodide containing iodine will react to form lead iodide $PbI_2$.

We claim—

1. A dry, surface-contact current rectifier, comprising a conductive layer of cuprous iodide containing free iodine, a lead plate and an intermediate poorly conductive layer of lead iodide.

2. A dry, surface-contact current rectifier, comprising a conductive plate covered with cuprous iodide containing free iodine, a lead plate and an intermediate film of lead iodide produced by the reaction betwen the cuprous iodide containing free iodine and the lead.

3. A dry, surface-contact current rectifier, comprising a cuprous plate covered with copper iodide containing free iodine, a lead plate and an intermediate film of lead iodide produced by the reaction between the cuprous iodide containing free iodine and the lead.

In testimony that we claim the foregoing as our invention, we have signed our names hereto.

ERNST FRIEDERICH.
WILFRIED MEYER